(12) United States Patent
Kim et al.

(10) Patent No.: US 6,270,028 B1
(45) Date of Patent: Aug. 7, 2001

(54) BAITCAST FISHING REEL WITH SPOOL FREE MECHANISM

(75) Inventors: Hyunkyu Kim, Broken Arrow; Christopher S. Littau, Bartlesville, both of OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/566,226

(22) Filed: May 5, 2000

(51) Int. Cl.$^7$ .................................................. A01K 89/00
(52) U.S. Cl. ............................................ 242/262; 242/321
(58) Field of Search ................................... 242/257, 259, 242/260, 261, 262, 270, 271, 321

(56) References Cited

U.S. PATENT DOCUMENTS

| | | | |
|---|---|---|---|
| 4,222,537 | * | 9/1980 | Noda ..................................... 242/261 |
| 4,648,566 | * | 3/1987 | Furomoto ............................. 242/259 |
| 4,899,952 | * | 2/1990 | Aoki ...................................... 242/260 |
| 5,193,763 | * | 3/1993 | Sakaguchi ............................ 242/261 |
| 5,613,646 | * | 3/1997 | Miyazaki ............................. 242/260 |
| 5,746,381 | * | 5/1998 | Miyazaki ............................. 242/261 |
| 5,791,576 | * | 8/1998 | Miyazaki ............................. 242/261 |
| 5,799,890 | | 9/1998 | Kim . |
| 5,855,330 | * | 1/1999 | Kobayashi ........................... 242/261 |
| 5,875,986 | * | 3/1999 | Miyazaki et al. .................... 242/261 |
| 5,904,310 | | 5/1999 | Miyazaki . |
| 6,045,074 | | 4/2000 | Kim . |

* cited by examiner

Primary Examiner—Emmanuel M. Marcelo
(74) Attorney, Agent, or Firm—Fellers, Snider, Blankenship, Bailey & Tippens, P.C.

(57) ABSTRACT

A fishing reel wherein is incorporated a spool free mechanism comprising: a crank handle nonrotatably secured to a crankshaft which rotates a drive gear. A mating pinion gear includes an inner shoulder and an outer shoulder which are supported by bearings, and a feature for drivingly engaging the spool shaft. The inner and outer shoulders are slidable within the supporting bearings such that, in a first position, the pinion gear is drivingly engaged with the spool shaft for rewinding the line and, in a second position, the pinion gear is disengaged from the spool shaft, allowing the spool to freely rotate during casting. In the second position, there is no contact between the spool shaft and the pinion gear, hence, the pinion gear does not cause unnecessary friction during a casting operation. The axial position of the pinion gear is fixed by the bearings which support the inner and outer shoulders thereby holding the pinion gear in precise alignment with the drive gear, thus improving the rewind operation and reducing wear on the drive gear and pinion gear.

8 Claims, 3 Drawing Sheets

BAITCAST FISHING REEL WITH SPOOL FREE MECHANISM

BACKGROUND OF THE INVENTION

1. Field of the Invention

This invention relates generally to rewinding systems for fishing reels. More particularly, but not by way of limitation, the present invention relates to a baitcast fishing reel wherein a pinion gear is rotatably supported such that, during casting, the pinion gear does not contact the spool or spool shaft, thereby reducing the friction acting on the spool during casting and, during rewind, the drive gear and the pinion gear are held in precise alignment.

2. Background

Baitcast fishing reels are well known in the art. A baitcasting reel will typically comprise a frame having a pair of opposing side plates; a foot extending from the frame for attaching the reel to a fishing rod; a line spool, rotatably positioned between the frame side plates, for retrieving and holding a fishing line; a spool shaft, on which the spool is secured, having ends extending through the frame side plates; a pinion gear (typically a helical gear) provided on the spool shaft; a manually rotatable crank handle; a gear train and crankshaft assembly mechanically linking the crank handle to the spool shaft pinion gear; a level-wind mechanism which transverses the spool during winding to ensure that the fishing line is properly wound along the length of the spool; a clutch mechanism for preventing reverse rotation of the crank handle; an exterior actuator (typically a thumb lever) for disengaging the pinion gear from the spool shaft to allow the spool to rotate during casting; and a spool drag or spool braking mechanism.

During casting, it is advantageous to reduce the frictional forces acting upon the spool in order to achieve the longest cast possible. In a typical baitcasting reel, the crank handle rotates a drive gear which, in turn drives a pinion gear which rotates the spool to rewind the fishing line. The pinion gear slides along the spool shaft such that, in a first position, the pinion gear nonrotatably engages the spool shaft, and in a second position, the spool shaft rotates in relation to the pinion gear for casting. In the second position, the spool shaft supports the pinion gear resulting in frictional contact between the spool shaft and the pinion gear. Although slight, this frictional force adversely affects casting performance.

When the fisherman begins turning the crank handle, the pinion gear is pushed into locking engagement with the spool shaft. The closeness of the fit between the spool shaft and the pinion gear determines the alignment between the drive gear and the pinion gear. Proper alignment is necessary for the reel to achieve a quality feel and for long gear life. Improper alignment results in roughness, noise, and undue wear during the rewind operation.

Thus it can be seen that conflicting needs exist for the interface between the spool shaft and the pinion gear. When casting, there should be minimal contact between the pinion gear and the spool shaft to improve casting distance. During rewind, close tolerances must be maintained for proper alignment between the pinion gear and the drive gear.

It is thus an object of the present invention to provide a baitcasting fishing reel wherein the pinion gear causes virtually no friction on the spool shaft during casting but is held in precise alignment with the drive gear during rewind.

SUMMARY OF THE INVENTION

The present invention provides a baitcasting fishing reel which incorporates a spool free mechanism wherein the pinion gear is rotatably released from the spool shaft during casting such that there is no contact between the spool shaft and the pinion gear. During rewind, the pinion gear is nonrotatably engaged with the spool shaft while being held in precise alignment with the drive gear.

The spool free mechanism incorporated in the inventive reel comprises a pinion gear having an inner shoulder and an outer shoulder rotatably supported within the frame. In an a first position, a first coupling member on the pinion gear nonrotatably engages a second coupling member on the spool shaft, allowing the user to rewind the fishing line with the crank handle. In response to a user accessible actuator, the pinion gear is placed in a second position wherein the first coupling member is disengaged from the second coupling member, allowing free rotation of the spool relative to the pinion gear for casting.

In a preferred embodiment of the inventive bait casting reel, the pinion gear includes inner and outer shoulders which are rotatably supported by bearings. In a first position, a keyed recess in the inner shoulder is nonrotatably engaged with a mating boss on the spool shaft. Thus, the spool will rotate in response to rotation of the pinion gear when driven by the drive gear. The bearings which support the inner and outer shoulder of the pinion gear maintain precise alignment between the drive gear and the pinion gear. In response to the exterior actuator, the pinion gear is pushed outward along the spool shaft into a second position wherein the keyed recess no longer engages the mating feature on the spool shaft, thereby allowing rotation of the spool shaft relative to the pinion gear. The bearings support the inner and outer shoulders such that the pinion gear is held in concentric alignment with the spool shaft so that there is no physical contact between the spool shaft and the pinion gear when the pinion gear is in its second position. Thus, when the external actuator is actuated for casting, there is no frictional contact between the pinion gear and the spool shaft, resulting in longer casts.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENT

Figure 1:
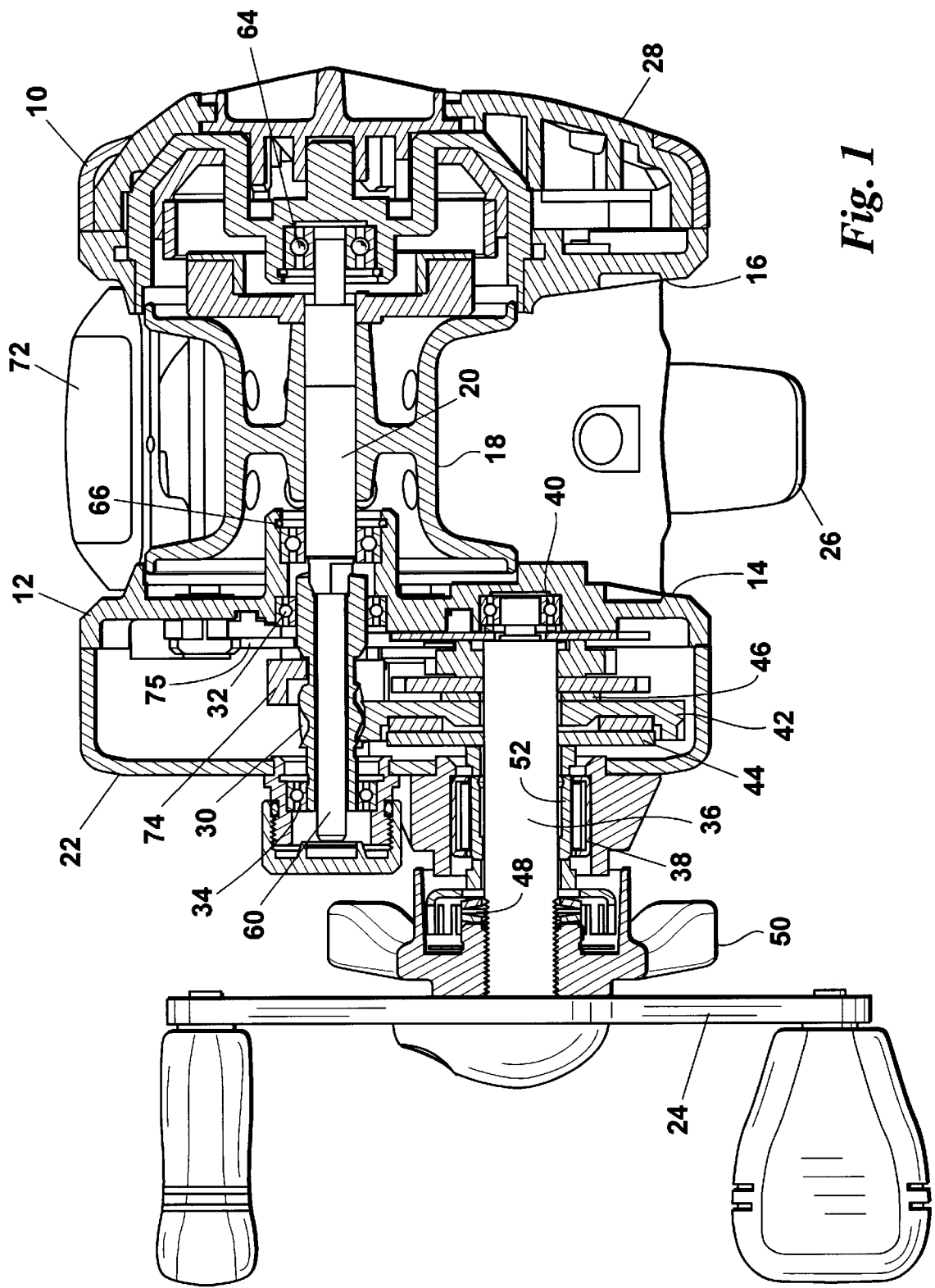
FIG. 1 provides a cutaway top view of the inventive baitcasting reel.
Figure 2:
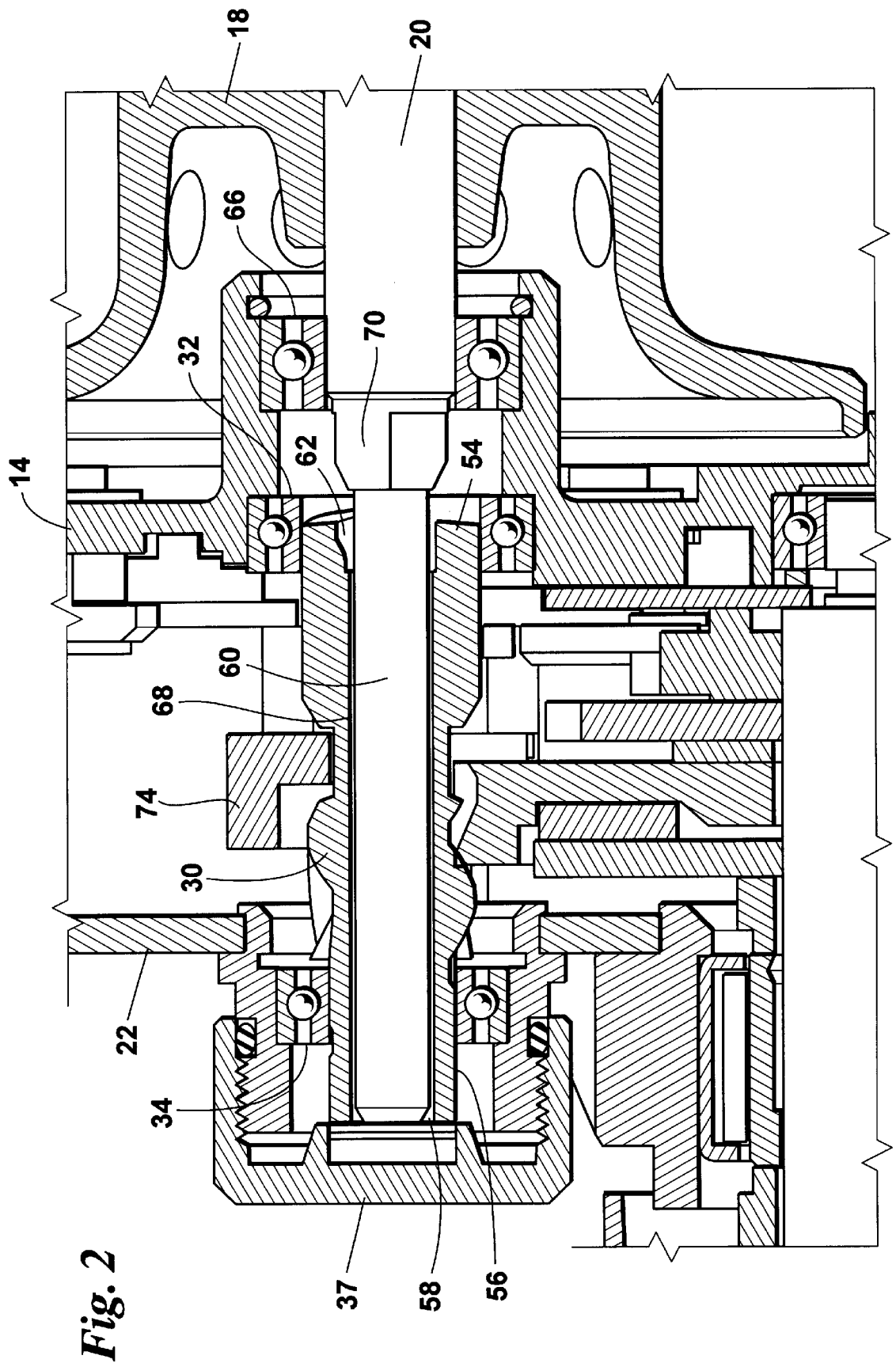
FIG. 2 provides a partial cutaway top view of the inventive baitcasting reel showing the pinion ,ear in the casting position.
Figure 3:
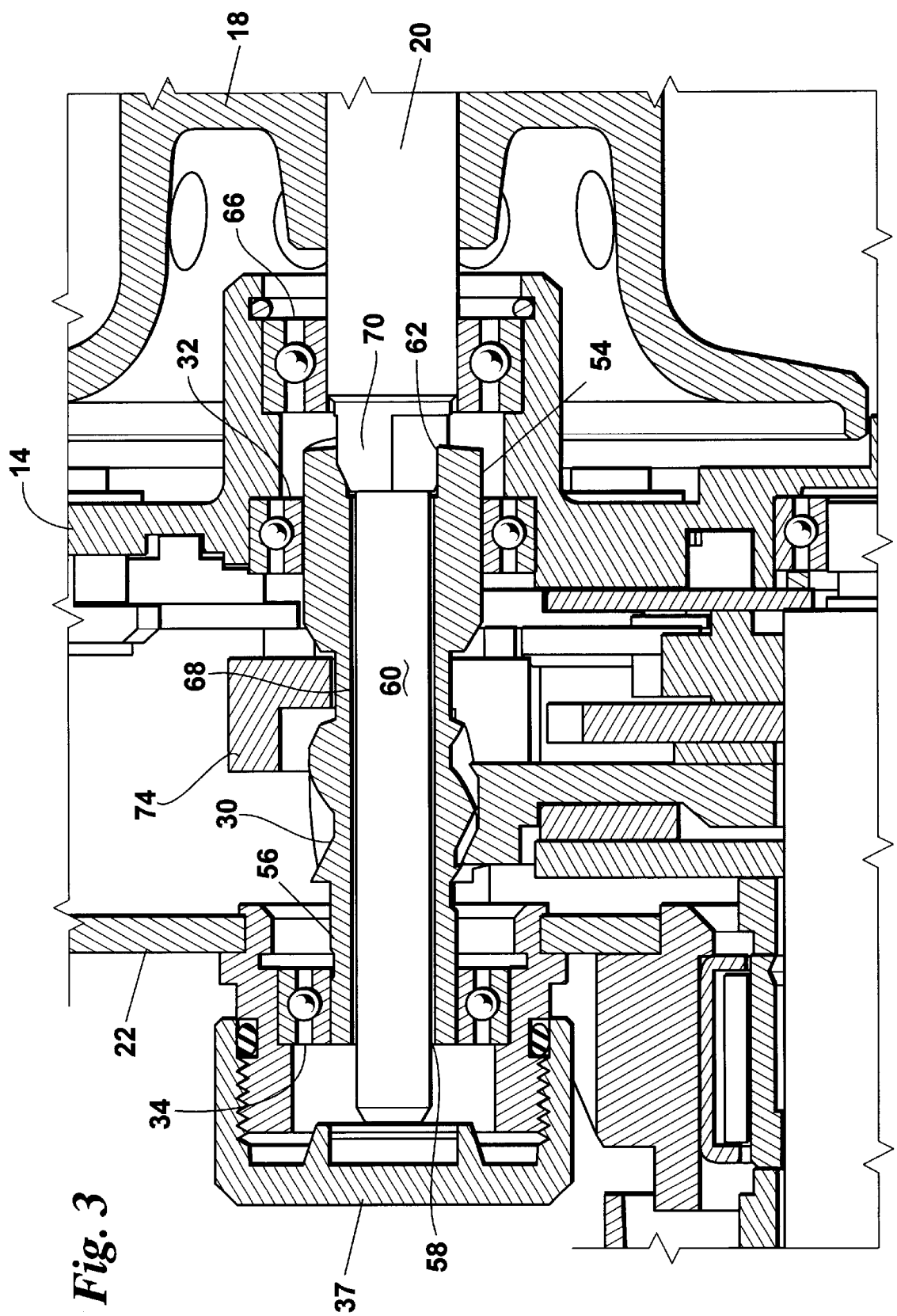
FIG. 3 provide a partial cutaway top view of the inventive baitcasting reel showing the pinion gear engaged with the spool shaft in its rewinding position.

The preferred embodiment of the inventive baitcasting 10 reel with spool free mechanism is shown in FIGS. 1–3. As best seen in FIG. 1, baitcasting reel 10 comprises a frame 12 having a first side plate 14 and a second side plate 16; a line spool 18 rotatably mounted in frame 12 between side plates 14 and 16; a spool shaft 20 extending through spool 18; a first side cover 22 secured over side plate 14; a crank handle 24, operably extending from first cover 22, for rotating spool 18; a reel foot 26, provided on the bottom of frame 12, for attaching reel 10 to a fishing rod; and a second side cover 28 secured over side plate 16.

Although for convenience, the inventive apparatus is shown herein and described as incorporated in a right-handed baitcasting reel, the inventive apparatus is equally adaptable for use in left-handed reels. As will be understood by those skilled in the art, a left-handed version of generally any baitcasting reel can be produced by simply reversing the arrangement and structure of the reel's components such that the left-handed reel is a mirror image of the right-handed version of the reel.

Crank handle 24 is secured to crankshaft 36 which passes through one-way clutch 38. Clutch 38 is secured to first side cover 22 such that crankshaft 36 is free to rotate only in one direction. The inner end of crankshaft 36 is supported in first side plate 14 by bearing 40. Drive gear 42 is sandwiched between drag washers 44 and 46 which are keyed to crankshaft 36 such that when the outward force exerted on the fishing line is not sufficient to overcome the friction between drive gear 42 and drag washers 44 and 46, the drive gear 42 rotates in response to crank handle 24. On the other hand, when an outward force is exerted on the fishing line which is sufficient to overcome the friction between drive gear 42 and drag washers 44 and 46, the drive gear will rotate in response to the force, allowing the fishing line to pay-out from the spool 18. Star wheel 50 is threadedly attached to crank shaft 36 such that when star wheel 50 is rotated clockwise, it moves axially along crankshaft 36 towards drive gear 42 thereby increasing the pressure applied to wave washer 48, which in turn applies pressure to drag washer 44 through clutch sleeve 52, increasing the friction between drive gear 42 and drag washers 44 and 46. Similarly, turning star wheel 50 counterclockwise will reduce the friction between drive gear 42 and drag washers 44 and 46.

Referring now to FIGS. 2 and 3, the pinion gear 30 includes an inner shoulder 54 rotatably supported by bearing 32 retained in first side plate 14; an outer shoulder 56 rotatably supported by bearing 34 retained in first side cover 22 by retainer 37; a passageway 58, slightly larger than the spool shaft extension 60 which extends longitudinally therethrough; and a socket 62 at the inner end of passageway 58. Inner shoulder 54 and outer shoulder 56 are free to slide longitudinally in bearings 32 and 34, respectively, over a limited distance. Retainer 37 is threadedly attached to side cover 22, thereby allowing the user selectively apply friction, if so desired, to spool shaft extension 60.

When reel 10 is assembled, spool shaft 20 is supported by bearing 64 (FIG. 1) and bearing 66 which hold spool shaft extension 60 concentric with pinion passageway 58 to maintain an annulus 68 therebetween. Spool shaft 20 includes a keyed boss 70 between spool 18 and extension 60.

As shown on FIGS. 1 and 3, when thumb actuator 72 is in its upward position, pinion slider 74 is pushed into its innermost position by a pair of springs (not shown), wherein socket 62 nonrotatably engages keyed boss 70. As thumb actuator 72 is pushed downward into its position, as depicted in FIG. 2, linkage 75 rotates to push pinion slider 74 outward, which in turn pushes pinion gear 30 to its outermost position wherein socket 62 is fully disengaged from boss 70, allowing free rotation of spool shaft 20 relative to pinion gear 30. In the disengaged position, annulus 68 is maintained so that there is no contact between pinion gear 30 and spool shaft 20, and thus, unnecessary friction is not created which would adversely effect casting.

Referring once again to FIG. 1, bearings 32 and 34 fix the axial position of pinion gear 30 relative to drive gear 42 independent of the position of pinion 30 along extension 60 and independent of the clearance between pinion 30 and extension 60. Therefore, pinion gear 30 is constantly held in precise alignment with drive gear 42, regardless of the state of the thumb actuator 72 and regardless of movement of spool shaft 20.

As will be understood by those skilled in the art, although the above preferred embodiment of the inventive apparatus has been shown as incorporated in a round baitcasting reel, it is equally suitable for use in a teardrop shaped baitcasting reel or, generally, any baitcasting reel.

As also will be understood by those skilled in the art, although the above-described preferred embodiment of the inventive apparatus has been explained with reference to a star drag mechanism, other types of drag assemblies could be employed with the present invention.

As will be further understood by those skilled in the art, although the above preferred embodiment of the inventive apparatus has been discussed in regard to a spool shaft extension 60 extending through passageway 58 in pinion gear 30, the invention is not so limited. Equivalent results could be achieved with a spool shaft which did not extend outward beyond keyed boss 70 eliminating the need for passageway 58, but still providing the advantage of precise alignment between drive gear 42 and pinion gear 30.

As will be further understood by those skilled in the art, while the above described pinion gear has been discussed in reference to a socket which receives a keyed boss on the spool shaft, other mating features which provide nonrotatable engagement would achieve similar results and are encompassed within the scope of the present invention, for example, a keyed boss on the pinion gear could be received in a socket on the spool shaft or spokes on the spool shaft could mate with notches on the end of the pinion gear.

As will be further understood by those skilled in the art, while the above preferred embodiment of the inventive apparatus has been described as incorporating bearings 32 and 34 to rotatably support pinion gear 30, the invention is not so limited. Equivalent methods to rotatably support pinion gear 30 include by way of example and not limitation, bushings or, the pinion gear 30, itself, could be made of bushing material and supported in an appropriate aperture provided in side plate 14 and in retainer 37.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A baitcast fishing reel comprising:

a frame;

a spool;

a spool shaft rotatably supported in said frame, said spool shaft extending through said spool and including a first coupling member;

a pinion gear slidably mounted proximate said spool shaft having at least a first position and a second position, said pinion gear being rotatably supported from said frame including:

an inner shoulder; and a second coupling member proximate said inner shoulder; and an actuator for moving said pinion gear between said first position and said second position, wherein, when said pinion gear is in said first position, said first coupling member and said second coupling member will be nonrotatably engaged, and wherein, when said pinion gear is in said second position, said first coupling member will be disengaged from said second coupling member thereby allowing said spool shaft to rotate relative to said pinion gear and said pinion gear is supported in concentric alignment with said speed shaft so that there is no contact between said pinion gear and said spool shaft.

2. The baitcasting reel of claim 1 wherein said first coupling member is a keyed boss and said second coupling member is a socket, said keyed boss being nonrotatably receivable in said socket.

3. The baitcasting reel of claim 1 further including a side cover, wherein said pinion gear further includes an outer shoulder rotatably supported from said side cover, and further comprising a pair of bearings rotatably supporting said inner and outer shoulders and allowing slidable movement of said pinion gear relative to said bearings.

4. The baitcasting reel of claim 3 wherein said pinion gear further includes a passageway extending axially through said pinion and said spool shaft includes and extension, said extension of a smaller diameter than said passageway and extension through said passageway such that there is an annulus maintained between said pinion gear.

5. A spool free mechanism for a baitcasting fishing reel comprising:

a pinion gear having a first position and a second position, said pinion gear including:

an inner shoulder; and
an outer shoulder;

a first bearing, said first bearing rotatably supporting said inner shoulder for sliding movement of said pinion gear relative to said bearing between said first position and said second position;

a second bearing, said second bearing rotatably supporting said outer shoulder for sliding movement of said pinion gear relative to said bearing between said first position and said second position; and an actuator for slidably moving said pinion gear between said first position and said second position.

6. The spool free mechanism of claim 5 further comprising a spool shaft including a second coupling member, said second coupling member for nonrotatable engagement with said first coupling member.

7. The spool free mechanism of claim 6 wherein said first coupling member is a socket and said second coupling member is a keyed boss, said keyed boss being nonrotatably receivable in said socket.

8. The spool free mechanism of claim 6 wherein when said pinion gear is in said first position, said first coupling member is in nonrotatable engagement with said second coupling member and when said pinion gear is in said second position, said first coupling member is disengaged from said second coupling member, thereby allowing rotation of said pinion gear relative to said spool shaft.

* * * * *

UNITED STATES PATENT AND TRADEMARK OFFICE
CERTIFICATE OF CORRECTION

PATENT NO. : 6,270,028 B1
DATED : August 7, 2001
INVENTOR(S) : Kim et al.

It is certified that error appears in the above-identified patent and that said Letters Patent is hereby corrected as shown below:

Column 5,
Line 9, replace "speed" with -- spool --.
Line 25, replace "extension" with -- extending --.
Line 26, insert after "between" -- said extension and --

Signed and Sealed this

Twenty-first Day of June, 2005

JON W. DUDAS
*Director of the United States Patent and Trademark Office*